United States Patent
Radovinsky et al.

(10) Patent No.: US 12,407,238 B2
(45) Date of Patent: Sep. 2, 2025

(54) WIND TURBINE GENERATOR WITH HIGH TEMPERATURE SUPERCONDUCTING ELEMENTS

(71) Applicants: Massachusetts Institute of Technology, Cambridge, MA (US); Commonwealth Fusion Systems LLC, Devens, MA (US)

(72) Inventors: Alexey Radovinsky, Cambridge, MA (US); Michael Segal, Cambridge, MA (US)

(73) Assignees: Massachusetts Institute of Technology, Cambridge, MA (US); Commonwealth Fusion Systems LLC, Devens, MA (US)

( * ) Notice: Subject to any disclaimer, the term of this patent is extended or adjusted under 35 U.S.C. 154(b) by 0 days.

(21) Appl. No.: 18/263,630

(22) PCT Filed: Feb. 8, 2022

(86) PCT No.: PCT/US2022/015572
§ 371 (c)(1),
(2) Date: Jul. 31, 2023

(87) PCT Pub. No.: WO2022/173717
PCT Pub. Date: Aug. 18, 2022

(65) Prior Publication Data
US 2024/0088773 A1    Mar. 14, 2024

Related U.S. Application Data

(60) Provisional application No. 63/147,498, filed on Feb. 9, 2021.

(51) Int. Cl.
*H02K 55/00* (2006.01)
*F03D 9/25* (2016.01)
(Continued)

(52) U.S. Cl.
CPC ............ *H02K 55/00* (2013.01); *F03D 9/25* (2016.05); *H02K 7/1838* (2013.01); *H01F 6/06* (2013.01)

(58) Field of Classification Search
CPC ........ H02K 55/00; H02K 7/1838; H01F 6/06; F03D 9/25
See application file for complete search history.

(56) References Cited

U.S. PATENT DOCUMENTS

| | | | |
|---|---|---|---|
| 4,101,793 A | | 7/1978 | Berthet et al. |
| 5,773,910 A | * | 6/1998 | Lange ............... H02K 1/27 310/90 |

(Continued)

FOREIGN PATENT DOCUMENTS

| | | |
|---|---|---|
| CA | 2 374 326 48 | 1/2001 |
| CA | 2374326 A1 * | 1/2001 |

(Continued)

OTHER PUBLICATIONS

Translation of JP-2011103708-A (Year: 2011).*

(Continued)

*Primary Examiner* — Sean Gugger
(74) *Attorney, Agent, or Firm* — Daly, Crowley, Mofford & Durkee, LLP; Christopher S. Daly

(57) ABSTRACT

A wind turbine generator includes a stator having a plurality of high-temperature superconducting coils. A current is driven through the high-temperature superconducting coils to produce a magnetic field. A rotor comprising one or more phase coils is physically coupled to a wind turbine. As the wind turbine turns the rotor, current is induced in the one or more phase coils to produce electrical power. The phase coils may include conductive material, superconducting material, and/or high-temperature superconducting material.

21 Claims, 9 Drawing Sheets

(51) Int. Cl.
*H02K 7/18* (2006.01)
*H01F 6/06* (2006.01)

(56) References Cited

U.S. PATENT DOCUMENTS

| | | | | |
|---|---|---|---|---|
| 2008/0143202 | A1* | 6/2008 | Whitener | H02K 3/51 |
| | | | | 29/598 |
| 2009/0229291 | A1 | 9/2009 | Winn | |
| 2010/0133943 | A1 | 6/2010 | Winn | |
| 2013/0181553 | A1* | 7/2013 | Wu | H02K 9/00 |
| | | | | 310/68 D |
| 2021/0270239 | A1* | 9/2021 | Torrey | H02K 55/02 |

FOREIGN PATENT DOCUMENTS

| | | | |
|---|---|---|---|
| CN | 109102986 | | 12/2018 |
| CN | 109102986 A | * | 12/2018 |
| EP | 1 247 325 40 | | 10/2005 |
| EP | 1 672 300 11 | | 6/2006 |
| EP | 2 521 252 23 | | 11/2012 |
| EP | 3 186 505 22 | | 1/2020 |
| JP | 2011103708 | | 5/2011 |
| JP | 2011103708 A | * | 5/2011 |
| JP | 2017175031 | | 9/2017 |
| JP | 2017175031 A | * | 9/2017 |
| WO | WO 2008/011184 53 | | 1/2008 |
| WO | WO 2020/005222 26 | | 1/2020 |
| WO | WO 2023/034257 28 | | 3/2023 |

OTHER PUBLICATIONS

Translation of JP-2017175031-A (Year: 2017).*
Translation of CN-109102986-A (Year: 2018).*
Choi, et al.; "A novel no-insulation winding technique of high temperature-superconducting racetrack coil for rotating applications: A progress report in Korea university"; Review of Scientific Instruments 87; Oct. 7, 2016; 13 Pages.
Kalsi; "Superconducting Wind Turbine Generator Employing MgB2 Windings Both on Rotor and Stator"; IEEE Transactions on Applied Superconductivity; vol. 24; No. 1; Feb. 2014; 7 Pages.
Song, et al.; "Designing and Basic Experimental Validation of the World's First MW-Class Direct-Drive Superconducting Wind Turbine Generator"; IEEE Transactions on Energy Conversion; Jan. 2019; 8 Pages.
PCT Search Report and Written Opinion of the ISA dated May 30, 2022 for International Application No. PCT/US2022/015572; 17 Pages.
PCT Search Report and Written Opinion of the ISA dated Dec. 7, 2022 for International Application No. PCT/US2022/041979; 15 Pages.
Response to European Communication pursuant to Rule 112(1) EPC dated Oct. 30, 2024 for European Patent Application No. 22777428.8; Response filed Dec. 17, 2024; 33 pages.

* cited by examiner

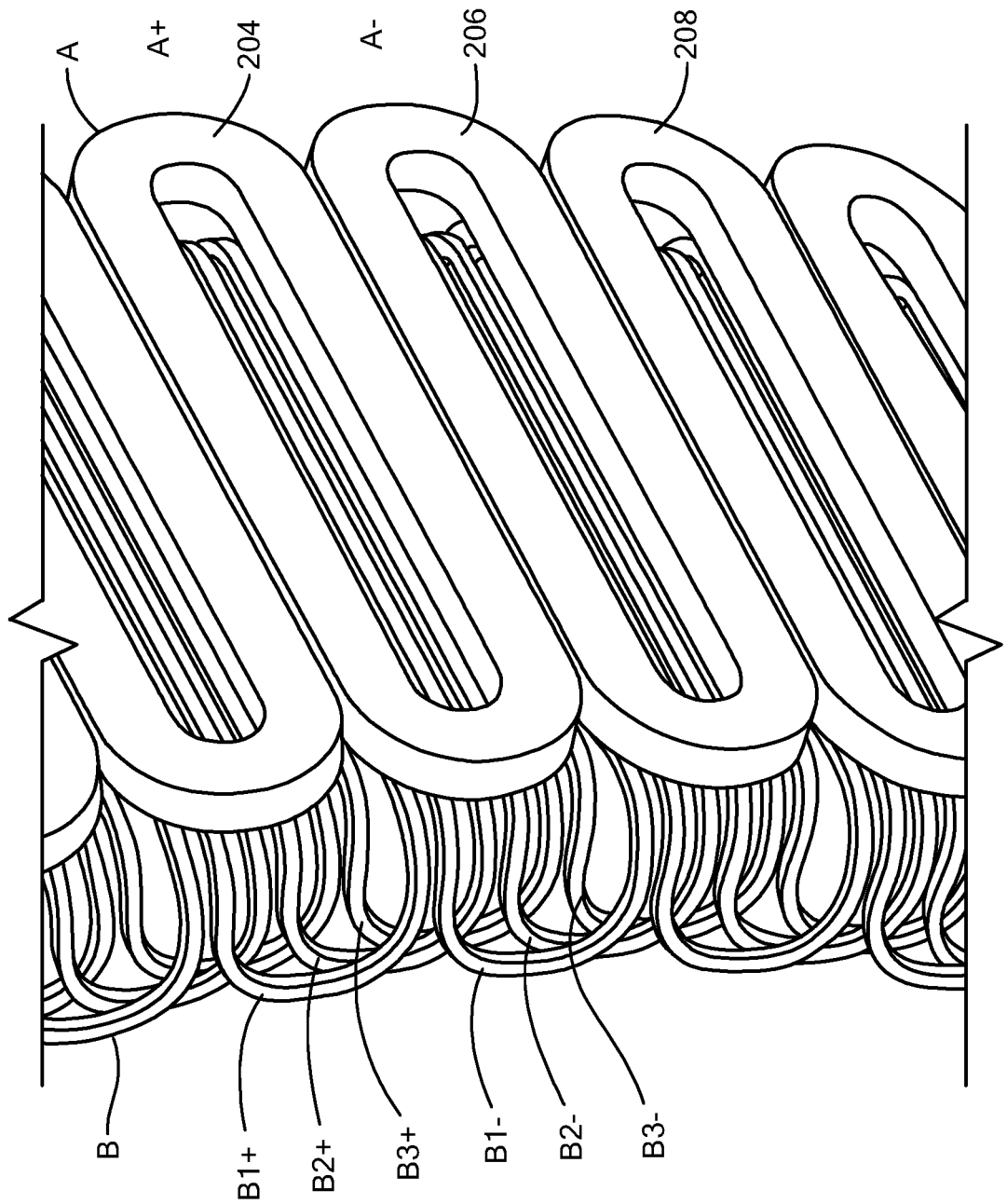

WIND TURBINE GENERATOR WITH HIGH TEMPERATURE SUPERCONDUCTING ELEMENTS

CROSS REFERENCE TO RELATED APPLICATIONS

This application a 371 National Stage Entry of International Patent Application No. PCT/US2022/015572 filed in the English language on Feb. 8, 2022, which claims the benefit of U.S. Provisional Application No. 63/147,498 filed on Feb. 9, 2021, which applications are hereby incorporated by reference in their entireties.

FIELD

This disclosure is related to wind turbine generators and, more particularly, to wind turbine generators utilizing high-temperature superconducting material.

BACKGROUND

Wind turbines are a necessary and beneficial addition to the field of green and sustainable energy production. Wind drives the turbine creating rotational energy. When the turbine is used for production of electricity, an electrical generator converts the rotational energy into electrical energy. Unlike traditional electrical plants that rely on coal, nuclear material, or other fuels, wind turbine generators do not require material fuel, and do not produce harmful emissions or byproducts.

Of course, every electrical generator loses some energy as heat, and some of the wind energy will inevitably be lost as heat during the energy conversion process. However, as the use of wind as a power source continues to increase on a global scale, development of electrically efficient generators will allow wind turbine towers to capture and convert more wind energy to electricity and lose less wind energy as heat.

SUMMARY

In an embodiment, an electrical generator comprises a stator, the stator comprising a plurality of high-temperature superconducting (HTS) magnets configured to generate a magnetic field; and a rotor comprising a first plurality of conductive coils, the rotor configured to rotate so that the conductive coils move through the magnetic field generated by the HTS magnets to produce electrical power.

One or more of the following features may be included.

The rotor may be coupled to a wind turbine that rotates the rotor.

The plurality of HTS magnets may be arranged to form a ring around the rotor.

At least one HTS magnet, arranged in turns, of the plurality of HTS magnets may comprise: a coil comprising an HTS tape and a housing comprising at least a first partition. The coil may be arranged within the housing. The first partition of the housing may be arranged to separate a first portion of the coil from a second portion of the coil such that turns of the first portion of the coil are entirely arranged within the first partition and turns of the second portion of the coil are entirely arranged outside of the first partition. The first partition may comprise a slit through which the coil passes.

The first partition may be configured to distribute mechanical forces within the at least one HTS magnet.

The at least one HTS magnet of the plurality of HTS magnets may comprise an electrically conducting material arranged between at least some turns of the coil.

At least one HTS magnet of the plurality of HTS magnets may comprise a plurality of pancakes, each of the pancakes having one or more turns of an HTS tape and one or more joints for electrically coupling the one or more turns of its HTS tape as part of an electrical circuit. A plurality of cooling plates may be included, each of the cooling plates having a terminal for thermally coupling the cooling plate to a cooling apparatus. The plurality of pancakes and the plurality of cooling plates may be stacked in an alternating fashion, each of the pancakes being electrically coupled by its one or more joints to the joints of either one or two neighboring pancakes, thereby forming an operating current path that includes the HTS tape in each of the pancakes, and each of the pancakes being adjacent to either one or two of the cooling plates for removing heat from the pancake via thermal conduction to the cooling apparatus.

At least one HTS magnet of the plurality of HTS magnets may have an oblong shape.

At least one coil of the first plurality of conductive coils may comprise at least one cable having a plurality of HTS components.

The at least one coil of the first plurality of coils may comprise: a plurality of electrically conductive segments extending along the cable, each of the plurality of electrically conductive segments comprising one of the plurality of HTS components; and an electrically insulating material arranged between adjacent electrically conductive segments of the plurality of electrically conductive segments that electrically insulates the plurality of electrically conductive segments from one another.

The plurality of HTS components may comprise HTS tape.

The plurality of HTS components may comprise a stack of HTS tape.

The stator may include a stator coil assembly having a second plurality of coils configured to generate a second magnetic field. The rotor may include a third plurality of conductive coils positioned to rotate through the second magnetic field. The stator coil assembly and the second plurality of conductive coils may be positioned closer to a centerline of the generator than the plurality of HTS magnets and the first plurality of conductive coils.

The at least one coil of the second plurality of coils and/or at least one coil of the third plurality of coils comprises a cable may have a plurality of HTS components.

The cable may comprise: a plurality of electrically conductive segments extending along the cable, each of the plurality of electrically conductive segments comprising at least one of the plurality of HTS components; and an electrically insulating material arranged between adjacent electrically conductive segments of the plurality of electrically conductive segments that electrically insulates the plurality of electrically conductive segments from one another.

In another embodiment, a wind turbine generator comprises: a stator, the stator comprising a plurality of high-temperature superconducting (HTS) magnets configured to generate a magnetic field; a rotor comprising a first plurality of conductive coils, the rotor configured to rotate so that the conductive coils move through the magnetic field generated by the HTS magnets to produce electrical power; and a plurality of wind turbine blades coupled to the rotor.

One or more of the following features may be included.

The stator may comprise a stator coil assembly having a second plurality of conductive coils configured to generate a second magnetic field; and the rotor may comprise a third plurality of conductive coils positioned to rotate through the second magnetic field. The stator coil assembly and the second plurality of conductive coils may be positioned closer to a centerline of the generator than the plurality of HTS magnets and the first plurality of conductive coils.

The first plurality of conductive coils, the second plurality of conductive coils, and the third plurality of conductive coils may comprise at least one cable. The cable may comprise: a plurality of HTS components; a plurality of electrically conductive segments extending along the cable, each of the plurality of electrically conductive segments comprising at least one of the plurality of HTS components; and an electrically insulating material arranged between adjacent electrically conductive segments of the plurality of electrically conductive segments that electrically insulates the plurality of electrically conductive segments from one another.

At least one HTS magnet of the plurality of HTS magnets may comprise: a coil comprising an HTS tape; and a housing comprising at least a first partition. The coil may be arranged within the housing. The first partition of the housing may be arranged to separate a first portion of the coil from a second portion of the coil such that turns of the first portion of the coil are entirely arranged within the first partition and turns of the second portion of the coil are entirely arranged outside of the first partition. And the first partition may comprise a slit through which the coil passes.

In another embodiment, a wind turbine generator comprises a stator comprising means for generating a magnetic field; and a rotor comprising a structure that moves through the magnetic field, the structure comprising means for producing electrical current while the structure moves through the magnetic field.

In another embodiment, an electric machine comprises a stator. The stator comprises at least one first coil including high-temperature superconducting (HTS) material. The electric machine also includes a rotor comprising at least one second coil including HTS material, the rotor configured to rotate relative to the stator.

One or more of the following features may be included.
The electric machine may be a generator.
The generator may be a wind turbine generator.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

FIG. 2B is a three-dimensional view of a portion of the outer stator and rotor of the generator of FIG. 2A.

DETAILED DESCRIPTION

In this disclosure, the term "turbine" refers to a machine that converts fluid motion into rotational motion. The term "wind turbine" refers to a machine that converts wind flow (or wind energy) into rotational motion (or rotational energy). The term "generator" refers to a machine that converts rotational motion (or rotational energy) into electrical current and/or voltage (or electrical energy). And the term "wind turbine generator" refers to a machine that combines a wind turbine and a generator to convert wind energy into electrical energy.

Figure 1:
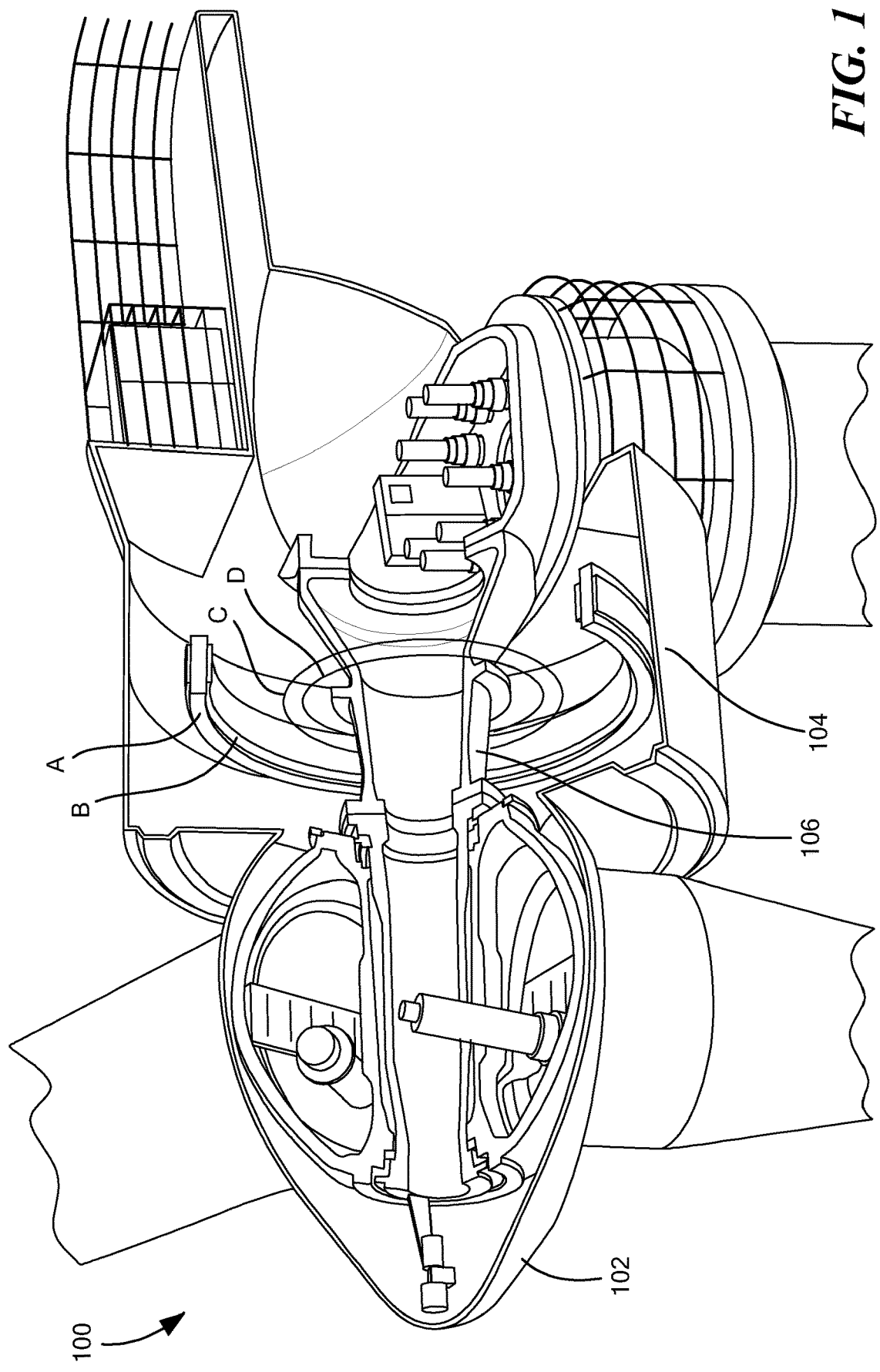
FIG. 1 is a three-dimensional drawing of a wind turbine generator.

FIG. 1 is a diagram of a wind turbine generator 100 that includes a wind turbine 102 and a generator 104. The generator includes a stationary stator A and a rotating rotor coil B. In embodiments, the generator 100 also includes a stationary stator coil D and rotating rotor coil C. Rotors B and C may be coupled to a shaft 106 of wind turbine 102 so that, as wind turns the turbine 102, rotor coils B and C (which may be part of a rotor assembly) rotate relative to stators A and D.

Stator A may comprise a plurality of high-temperature superconducting ("HTS") coils that produce a magnetic field. Stator coil D may also comprise coils that generate a magnetic field. Rotors B and C may include conductive coils so that, when the rotors rotate through the magnetic fields produced by stators A and D, the magnetic fields drive current through the coils of the rotors, thus producing electrical power. In embodiments, rotors B and/or C may include multiple phase coils so that the output of the generator 104 is a multi-phase output. Also, in embodiments, the electrical coils of stator coil D, rotor coil B, and/or rotor coil C may include (or may be) HTS coils.

Figure 2A:
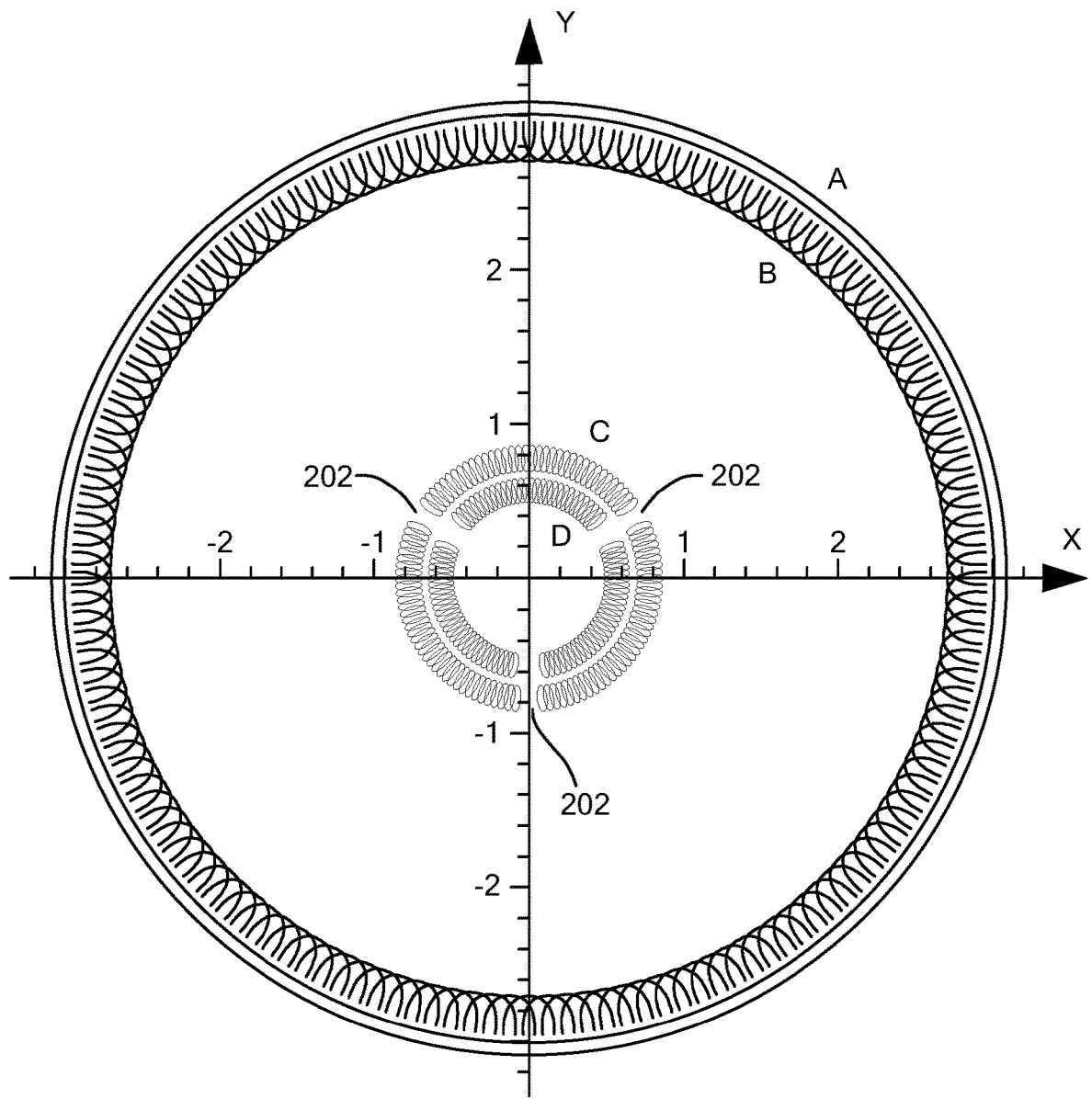
FIG. 2A is a drawing of stators and rotors of a generator.

Referring to FIG. 2A, the stators A and D, and the rotors B and C, of generator 104 are shown. As noted above, stators A and D may remain stationary. Current is induced in the rotor coil B, which rotates in the constant magnetic field produced by the coils of stator A. Phases of rotor coil C may be connected in series with like phases of Coil B, so that currents in rotor coil C are driven by, and have the same magnitude as, those of rotor coil B. Stator coil D rotates (relative to rotor coil C) in the magnetic field produced by rotor Coil C. Current in stator coil D is induced by this rotation. Coil D may be connected to an electric power grid and may feed the current generated by the wind generator into the grid.

Rotor coil C and stator coil D are shown having three gaps 220 to indicate that rotor coil C and stator coil D may be three-phase devices in some embodiments. One skilled in the art will recognize that, in embodiments, the physical structure of rotor coil C and stator coil D may differ from the three-gap structure shown. For example, in three-phase embodiments, rather than gaps that separate the phases, rotor coil C and/or stator coil D may comprise three separate coils that physically intertwine. In embodiments, one or more coils of rotor coil B may be electrically coupled in series to one or more coils of rotor coil C.

Referring to FIG. 2B, a portion of stator A and rotor coil B are shown, illustrating an example of intertwining phase coils of rotor coil B. In this example, rotor coil B includes three coils B1, B2, and B3 that intertwine along the length of the rotor. The stator A comprises a plurality of coils 204, 206, 208, which may produce magnetic fields of alternating direction, as will be discussed below. As the coils B1-B3 rotate through the magnetic fields produced by stator A, current is induced in the coils.

Figure 3:
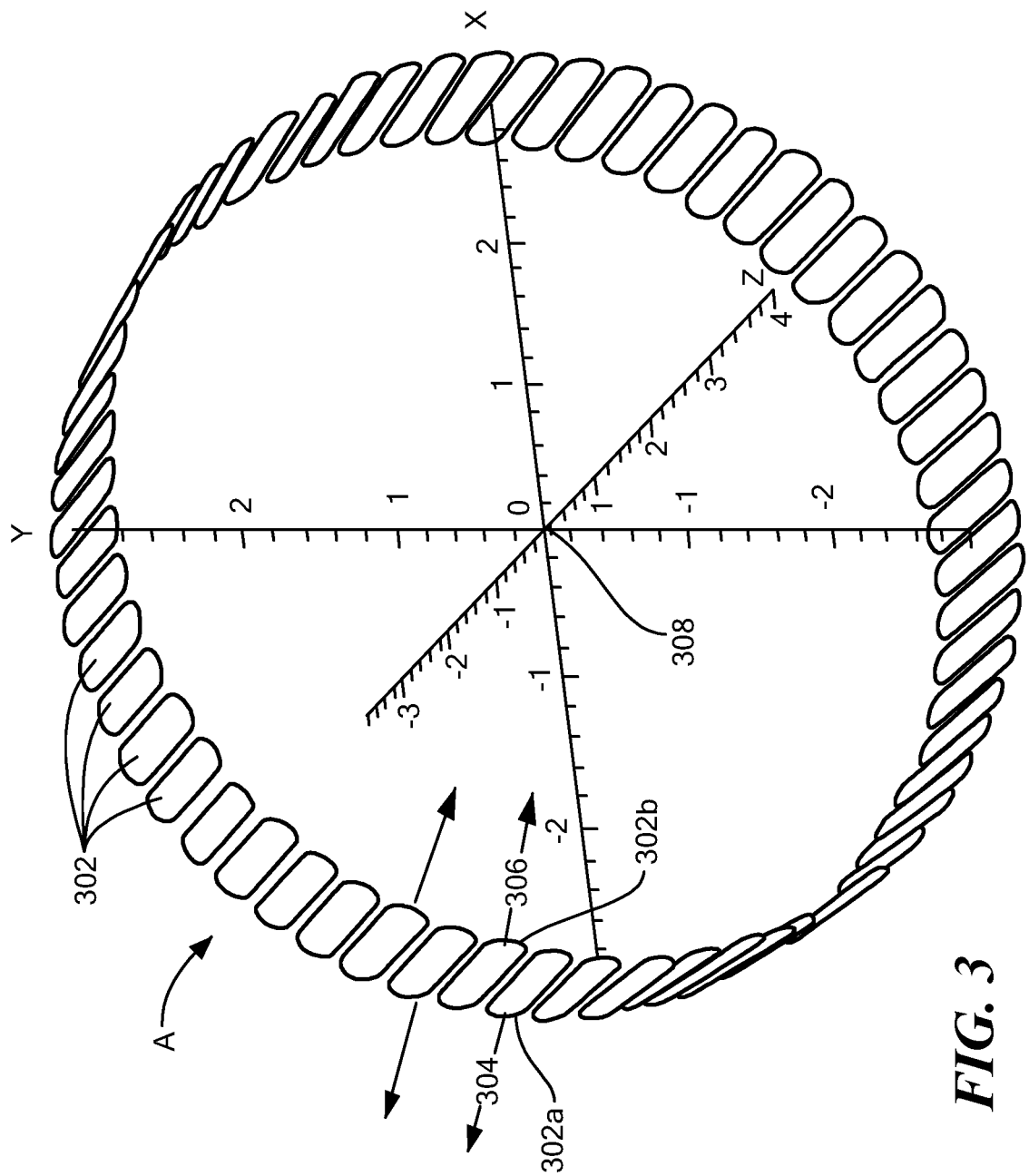
FIG. 3 is a three-dimensional view of the outer stator of the generator of FIG. 2A.

FIG. 3 is a three-dimensional drawing of stator A. As shown, stator A may comprise a series of coils 302 placed adjacent to each other to form the ring shape of stator A. Each of the coils 302 may be configured to produce a magnetic field when current is driven through the coil. In embodiments, adjacent coils (e.g. coils 302a, 302b) may be configured to produce magnetic fields having magnetic moments of opposite radial directions. For example, coil 302a may produce a magnetic field with a moment 304 that points radially outward from a center point 308 of the stator while adjacent coil 302b may produce a magnetic field with a moment 306 that points radially inward toward center point 308. In some embodiments, each coil 302 produces a magnetic field with a moment that has a direction opposite to those produced by its adjacent neighbor coils. In other embodiments, one or more coils 302 may produce a magnetic field with a moment that has the same radial direction as one or both of its adjacent neighbor coils to create varying patterns of alternating magnetic fields around the circumference of stator A.

Figure 4:
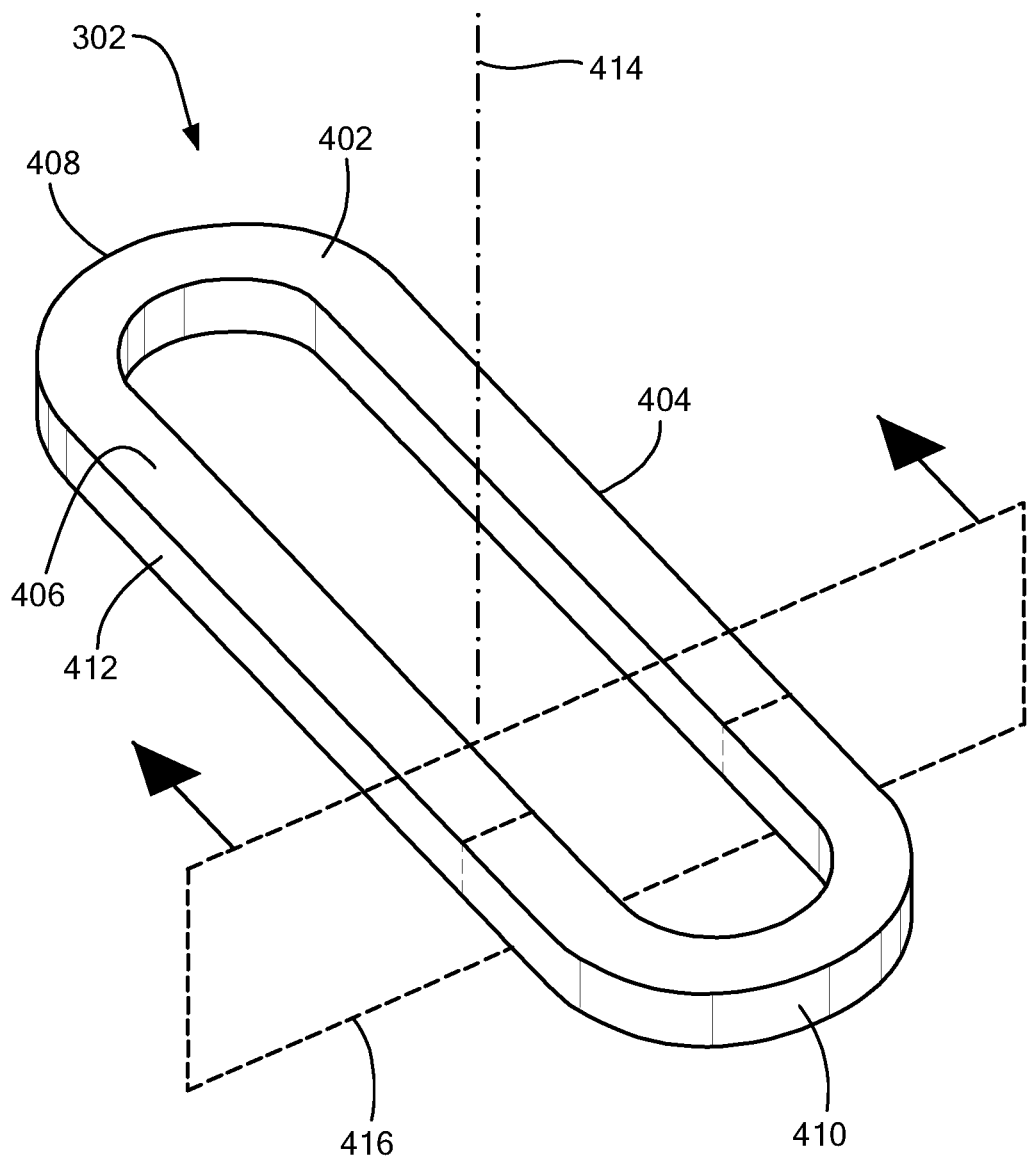
FIG. 4 is a three-dimensional view of a high-temperature superconducting coil of a stator.

FIG. 4 is a three-dimensional view of one of the coils 302 of stator A. In embodiments, the body 402 of the coil 302 is symmetrical about a center line 314. The body 402 may form an oblong shape having straight, elongate side portions 404, 406 and rounded end portions 408, 410 (i.e. a "racetrack" shape). The side portions 404, 406 may have a planar surface 412 on their outside edge so they can be positioned adjacent to neighboring coils to form the circular stator A, as shown in FIG. 3. In embodiments, the surface 412 may have a bevel relative to centerline 414 so to facilitate positioning the coils 302 to form a circular stator. In other embodiments, the body 402 of coil 302 may be rectangular, circular, or have any other shape that allows a plurality of coils to be placed adjacent to each other to form a circular stator A and generate a magnetic field, as mentioned above.

Figure 5:
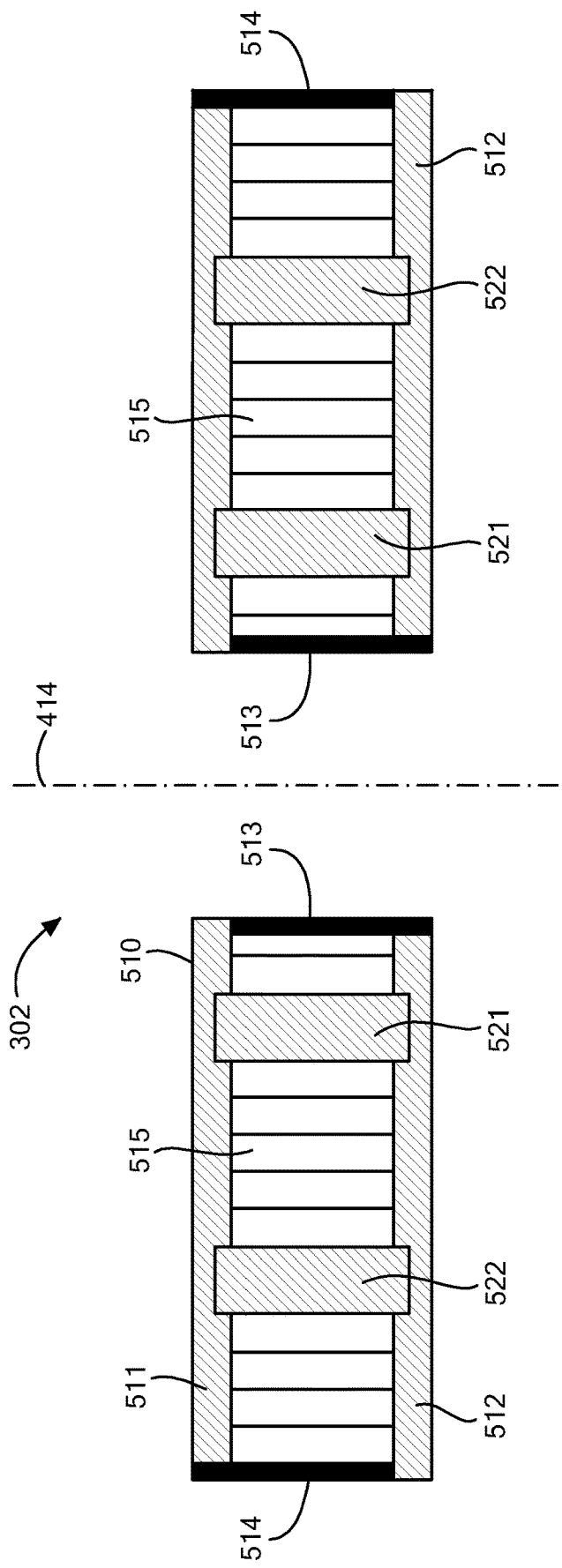
FIG. 5 is a cross sectional view of an embodiment of the coil of FIG. 4.

Referring to FIG. 5, a cross section of coil 302 viewed from plane 416 (FIG. 4) is shown. The coil 302 may be formed from a superconducting magnet comprising structural partitions, according to some embodiments. In the embodiment shown, coil 302 includes a housing 510 which comprises an upper plate 511 and a lower plate 512, as well as an inside spindle 513 and an outside cap 514. A single continuous piece of HTS tape 515 may be wound around the central spindle 513. Alternatively, several coupled pieces of HTS tape may be wound together as a single winding. Due to the cross-sectional view shown in FIG. 5, the same HTS tape is shown in successive windings at different radii from the centerline 414. The coil 302 also includes one or more structural partitions (hereinafter "partitions") 521 and 522, through which the HTS tape 515 passes as it winds around the central structure. The locations where the HTS tape 515 passes through the partitions are not shown in FIG. 5 for clarity, although partitions 521 and 522 may include a feedthrough slit for the HTS tape 515 to pass through.

According to some embodiments, partitions 521 and 522 may have a racetrack shape like of the coil body 402 shown in FIG. 5. In other embodiments, if the body of the coil 302 is a rectangular, circular, or other shape, partitions 521 and 522 may be rectangular, circular, or match the shape of the body 402 of coil 302.

According to some embodiments, the upper plate 511 and the lower plate 512 may comprise, or may consist of, a high mechanical strength material such as but not limited to steel, Inconel®, Nitronic® 40, Nitronic® 50, Incoloy®, or combinations thereof. In some embodiments, partitions 521 and 522 may comprise, or may consist of, a high mechanical strength material such as but not limited to steel, Inconel®, Nitronic® 40, Nitronic® 50, Incoloy®, high entropy alloys, high strength composites, ceramics, or combinations thereof.

According to some embodiments, the HTS tape 515 may comprise a rare earth barium copper oxide superconductor (REBCO), such as yttrium barium copper oxide (YBCO). In some embodiments, the HTS tape may comprise a long, thin strand of HTS material with cross-sectional dimensions in the range of about 0.001 mm to about 0.1 mm in thickness (or height) and a width in the range of about 1 mm to about 12 mm. According to some embodiments, each strand of HTS tape may comprise an HTS material such as REBCO in addition to an electrically conductive material. In some embodiments, the electrically conductive material may be disposed on the REBCO. In some embodiments, the electrically conductive material may be a cladding material such as copper. In some embodiments, HTS tape may comprise a polycrystalline HTS and/or may have a high level of grain alignment.

In some embodiments, the HTS tape 515 may be co-wound with a non-superconducting material, such as steel or copper. A stack of HTS tapes may be co-wound with one or more layers of the co-winding material. In some embodiments, additional conductive materials may be included in magnet 500 to fill potential gaps between components. For instance, a soft metal such as indium may be arranged between either the upper plate 511 or lower plate 512 and the HTS tape.

Figure 6:
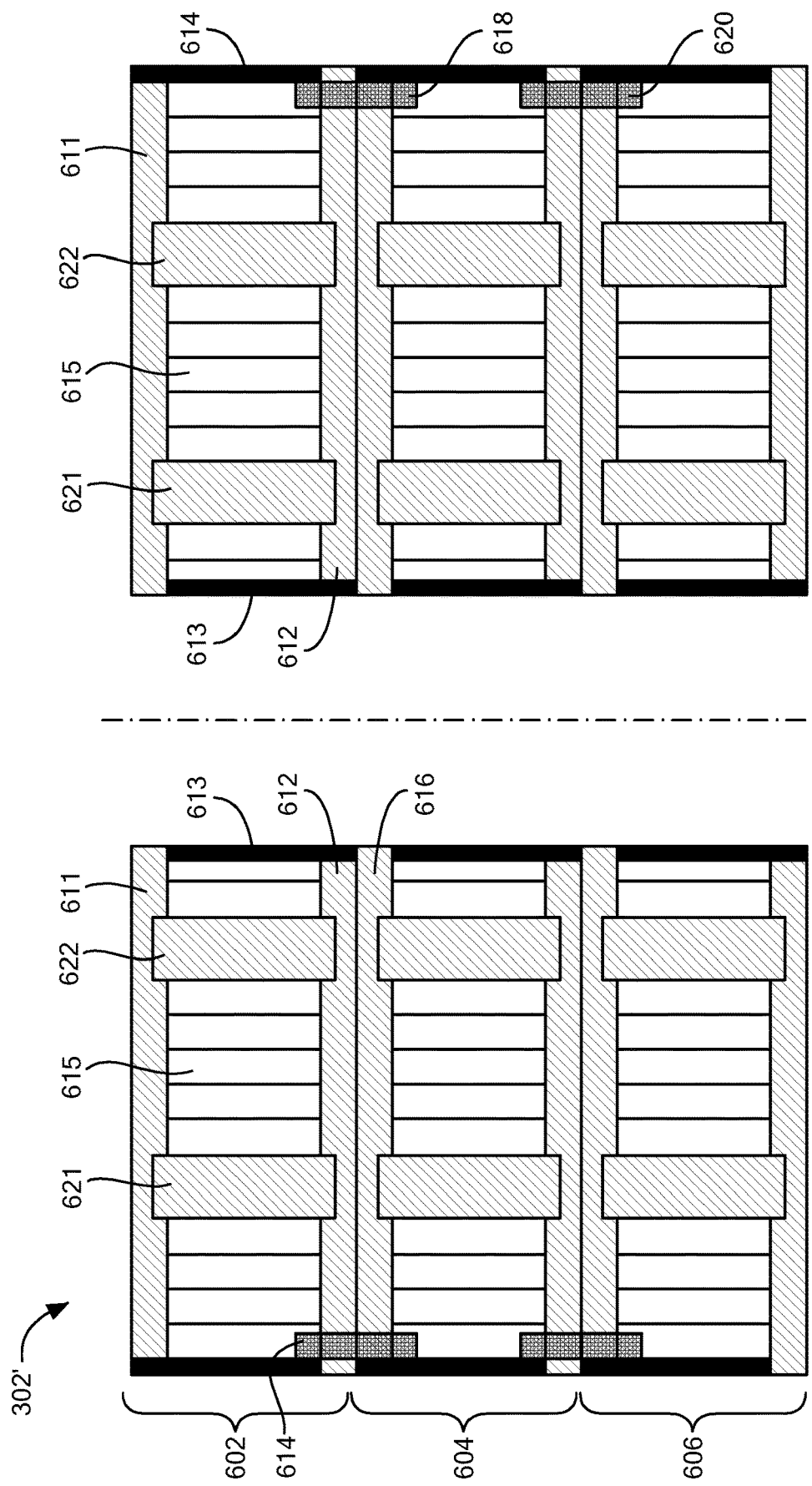
FIG. 6 is a cross sectional view of another embodiment of the coil of FIG. 4.

Referring to FIG. 6, a cross sectional view of another embodiment of a coil 302' is shown. This embodiment includes a plurality of stacked coils 602, 604, and 606 (which may be referred to as "pancakes"), each of which may be the same as or similar to coil 302 described in FIG. 5. Each pancake 602, 604, 606 may have a housing which comprises an upper plate 611 and a lower plate 612, as well as an inside spindle 613 and an outside cap 614. A single continuous piece of HTS tape 615 may be wound around the central spindle 613 of each stacked coil. Alternatively, several coupled pieces of HTS tape may be wound together as a single winding. Each stacked coil also includes one or more partitions 621 and 622, through which the HTS tape 615 passes as it winds around the spindle 613. The locations where the HTS tape 615 passes through the partitions are not shown in FIG. 5 for clarity, although partitions 621 and 622 may include a feedthrough slit for the HTS tape 615 to pass through.

According to some embodiments, the HTS tapes of adjacent pancakes are continuously coupled by electrical joints 618 and 620 so that the HTS tapes in each pancake form a continuous, HTS winding. Although shown on the outside diameter of the coil, electrical joints may be positioned on the inside diameter of the coil, the outside diameter of the coil, or both. To cool the stacked pancake coils, thermally conductive (e.g., copper, aluminum, silver, gold, graphine, etc.) cooling plates may be positioned between the pancakes. The cooling plates may be electrically insulated to prevent electrical shorts between the pancakes. This insulation may be accomplished by coating each surface with a layer of electrical insulator, such as polytetrafluoroethylene (PTFE) or similar, and solidifying the insulator. It is appreciated that other coatings may be used. The cooling plates may be coupled to a cooling apparatus that removes heat from the pancake stack.

By way of example, coil 302' is shown with three stacked pancake coils. It is understood that, in other embodiments, coil 302' may include more or fewer than three stacked pancakes.

Other examples of, and additional information about, the coils and windings in FIG. 5 and FIG. 6 can be found in PCT Patent Application No. PCT/US21/33349 (filed Jun. 7, 2021) and U.S. Provisional Patent Application No. 63/027,552 (filed May 23, 2021), which are incorporated herein by reference in their entirety.

Figure 7:
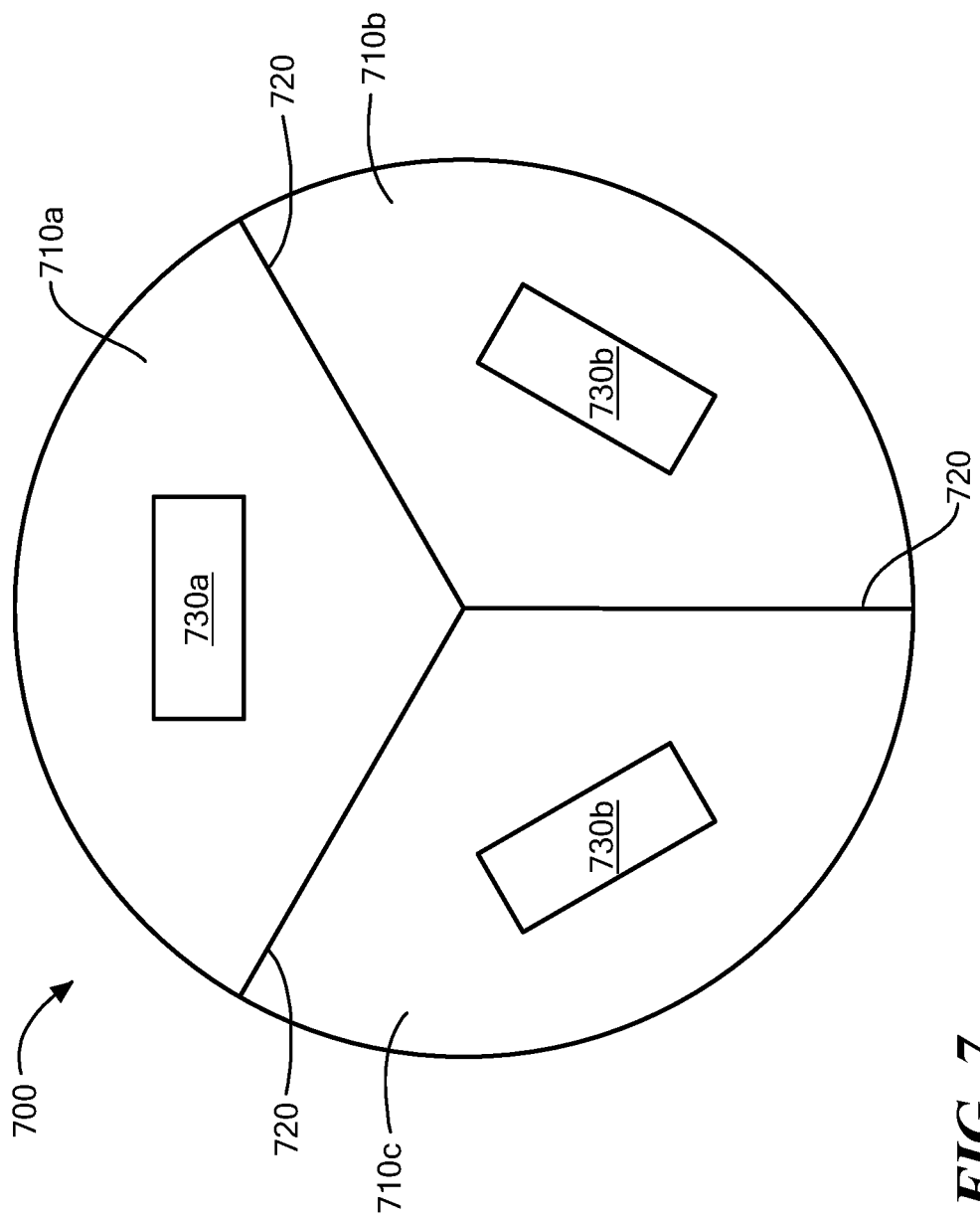
FIG. 7 is a cross sectional view of a cable that may be used as part of a rotor or stator of a wind turbine generator.

Referring to FIG. 7 and FIG. 2A, an example of a cross section of a conductive cable 700 is shown. Cable 700 may be used to create windings for rotor coil B or rotor coil C. (See FIG. 2A). As discussed above, the windings of rotor coil B may rotate through the magnetic field created by the coils of stator A to induce current through the windings of rotor coil B.

Cable 700 may also be used to create windings of stator coil D. Current is induced in the rotor coil B, which rotates in the constant magnetic field produced by the coils of stator A. Phases of rotor coil C may be connected in series with like phases of Coil B, so that currents in rotor coil C are driven by, and have the same magnitude as, those of rotor coil B. Stator coil D rotates (relative to rotor coil C) in the magnetic field produced by rotor Coil C. Current in stator coil D is induced by this rotation. Coil D may be connected to an electric power grid and may feed the current generated by the wind generator into the grid.

Conductive cable 700 may comprise conductive material that runs along the length of the cable to carry electrical current induced by the wind turbine generator. In other embodiments, cable 700 may include superconducting material along its length to carry the electrical current. In yet other embodiments, cable 700 may include HTS material.

The example in FIG. 7 illustrates an embodiment where cable 700 includes HTS material that carries the generated current. Cable 700 comprises a plurality of electrically conductive segments, here three electrically conductive segments 710, which may be separated from one another by an electrically insulating material 720. Each of the electrically conductive segments 710a, 710b, 710c, generally referred to herein as 710 supports, is in electrical contact with a respective superconductor component 730a, 730b, 730c generally referred to herein as 730. Electrically insulating material 720 may reduce eddy currents and coupling heating (and in some cases by a significant factor) compared with a cable that utilizes a single region of electrically conductive material to support each of the superconductor components of the cable. The insulating material 720 may fully insulate each of the electrically conductive segments 710 from one another.

During operation of the cable 700, at least the superconductor components 730 are cooled to below their superconducting transition so that they may carry current at zero resistance. The electrically conductive segments 710 act as stabilizers during a quench: when one of the superconductor components 730 quenches, heat may be conducted through the electrically conductive segment that supports the quenched superconductor component to the other electrically conductive segments, thereby quenching the whole cross section of the cable. Subsequently, a non-superconducting zone within superconductor components 730 may be created and propagate along the cable.

According to some embodiments, each electrically conductive segment 710 may be arranged in electrical contact with a respective superconductor component 730. Such contact may occur as a result of direct physical contact between the electrically conductive segment and the respective superconductor component, and/or may occur as a result of indirect contact via an intermediate electrically conductive material.

In the example of FIG. 7, the electrically conductive segments 710 are arranged in a radially symmetric manner around a central axis of the cable. This configuration may provide for simpler fabrication of the cable, since the electrically conductive segments may be fabricated with the same cross-sectional dimensions, then assembled in the cable 700. Notwithstanding these advantages, any suitable size and shape of electrically conductive segments may be employed in a cable.

According to some embodiments, electrically conductive segments 710 may comprise, or may consist of, copper. Copper may represent a desirable material due to its high thermal conductivity, thereby providing a stabilizing function in case of a quench, as well as being electrically conductive. Other suitable materials that electrically conductive segments 710 may comprise, or may consist of, include aluminum.

According to some embodiments, electrically insulating material 720 is arranged to contact different ones of the electrically conductive segments 710 on either side. As shown in FIG. 7, electrically insulating material 720 is arranged between adjacent pairs of the electrically conductive segments 710, and may be arranged so as to contact both segments of the pair (ideally, so as to leave no gaps, or substantially no gaps, between the electrically insulating material 720 and each electrically conductive segment). In some embodiments, the insulating material 720 may be provided in the form of a tape that may be arranged between the pairs of the electrically conductive segments 710. In some cases, the tape may be an adhesive tape and adhered to the adjacent electrically conductive segments 710 via the adhesive so that the tape is adhered to the electrically conductive segments.

According to some embodiments, superconductor components 730 may comprise one or more HTS's. The superconducting critical temperature (which in the case of HTS material may be greater than or equal to about 30 degrees K) can in some cases depend on other factors such as the presence of an electromagnetic field. It will be appreciated that where the critical temperature of a material is referred to herein, this may refer to whatever the critical temperature happens to be for that material under the given conditions.

In some embodiments, superconductor components 730 may comprise an HTS tape, which is a long, thin strand of HTS material with cross-sectional dimensions in the range of about 0.001 mm to about 0.1 mm in thickness (or height) and a width in the range of about 1 mm to about 12 mm (and with a length that extends along the length of the cable, i.e., into and out of the page in the example of FIG. 7). In some embodiments, HTS tape may comprise a polycrystalline HTS and/or may have a high level of grain alignment. In some embodiments, superconductor components 730 may comprise a stack of HTS tapes, being a plurality of HTS tapes arranged on top of one another along the width and length directions. An HTS tape stack may thereby have a thickness equal to (or approximately equal to) the thickness of an individual tape multiplied by the number of tapes in the stack.

According to some embodiments, insulating material 720 may comprise polyimide (e.g., Kapton®), epoxy resin, phenolic resin, a plastic, an elastomer, steel (e.g., stainless steel) or combinations thereof. According to some embodiments, insulating material may have a breakdown voltage or dielectric strength of greater than 25 kV/mm, of greater than 50 kV/mm, of greater than 75 kV/mm, of greater than 1000 kV/mm.

In some embodiments, insulating material 720 may comprise, or may consist of, a high-resistivity material that is nonetheless electrically conductive to some extent. In this respect, references to material 720 being "insulating" refers to the fact that the material 720 is much less electrically conductive than the material making up the electrically conductive segments 710. For instance, in some embodiments, the electrically conductive segments 710 may comprise a highly conductive material such as copper, whereas the insulating material 720 may comprise steel, which is not strictly an insulator but is nonetheless far more insulating than copper.

In the example of FIG. 7, the electrically conductive segments 710 may provide mechanical integrity to the cable in addition to the aforementioned advantages with respect to quenching behavior. The electrically conductive segments 710 may be formed into or may conform to a desired shape or winding, and may provide a substantial amount of structural strength to the cable.

According to some embodiments, electrically conductive segments 710 may be twisted along the length of the cable 710. That is, the electrically conductive segments 710 may be twisted around a central longitudinal axis of the cable; as such, the cross-sectional view of FIG. 7 may be accurate at various points along the cable but for the rotational orientation of the view shown, which will rotate about the center of the cable as the cross-sectional view is moved along the length of the cable. A helical path is one example of a twisted path that the electrically conductive segments may follow around the central longitudinal axis of the cable. In such a configuration, the electrically conductive segments 710 may be aligned along respective helical paths with a center of each helix being the central longitudinal axis of the cable. Similarly, the superconductor components 730 may be supported by the electrically conductive segments 710 along the length of the cable in the manner shown in FIG. 7, and thereby also be aligned along respective helical paths with a center of each helix being the central longitudinal axis of the cable. Arranging the superconductor components 730 along twisted paths may reduce the length over which two conductive paths are parallel to one another, and thereby reduce this source of inductive heating.

According to some embodiments, cable 700 may comprise one or more cooling channels, such as tubular cooling channels that may run along the longitudinal axis of the cable. Although the example of FIG. 7 does not illustrate any cooling channels, in general any number of channels may be formed or otherwise provided through the cable to provide cooling to the electrically conductive segments 710 and/or to the superconductor components 730. Such channels may for instance provide a path for cryogenic liquid such as liquid helium or liquid nitrogen to flow and carry heat away from the electrically conductive segments 710 and/or the superconductor components 730. In some cases, one or more cooling channels may be arranged in contact with, or in close proximity to, the electrically conductive segments 710.

In such cases, cooling of the superconductor components 730 may be achieved indirectly through cooling of the electrically conductive segments. In other cases, one or more cooling channels may be arranged in contact with, or in close proximity to, the superconductor components 730. Coolant may be provided through a cooling channel at a high pressure, such as above 2 bar.

According to some embodiments, cable 700 may comprise a jacket arranged exterior to the electrically conductive segments 710. A jacket may provide additional structural stability over and above that provided by the electrically conductive segments 710, and may for instance comprise, or may consist of, steel, Inconel®, Nitronic® 40, Nitronic® 50, Incoloy®, or combinations thereof.

Figure 8:
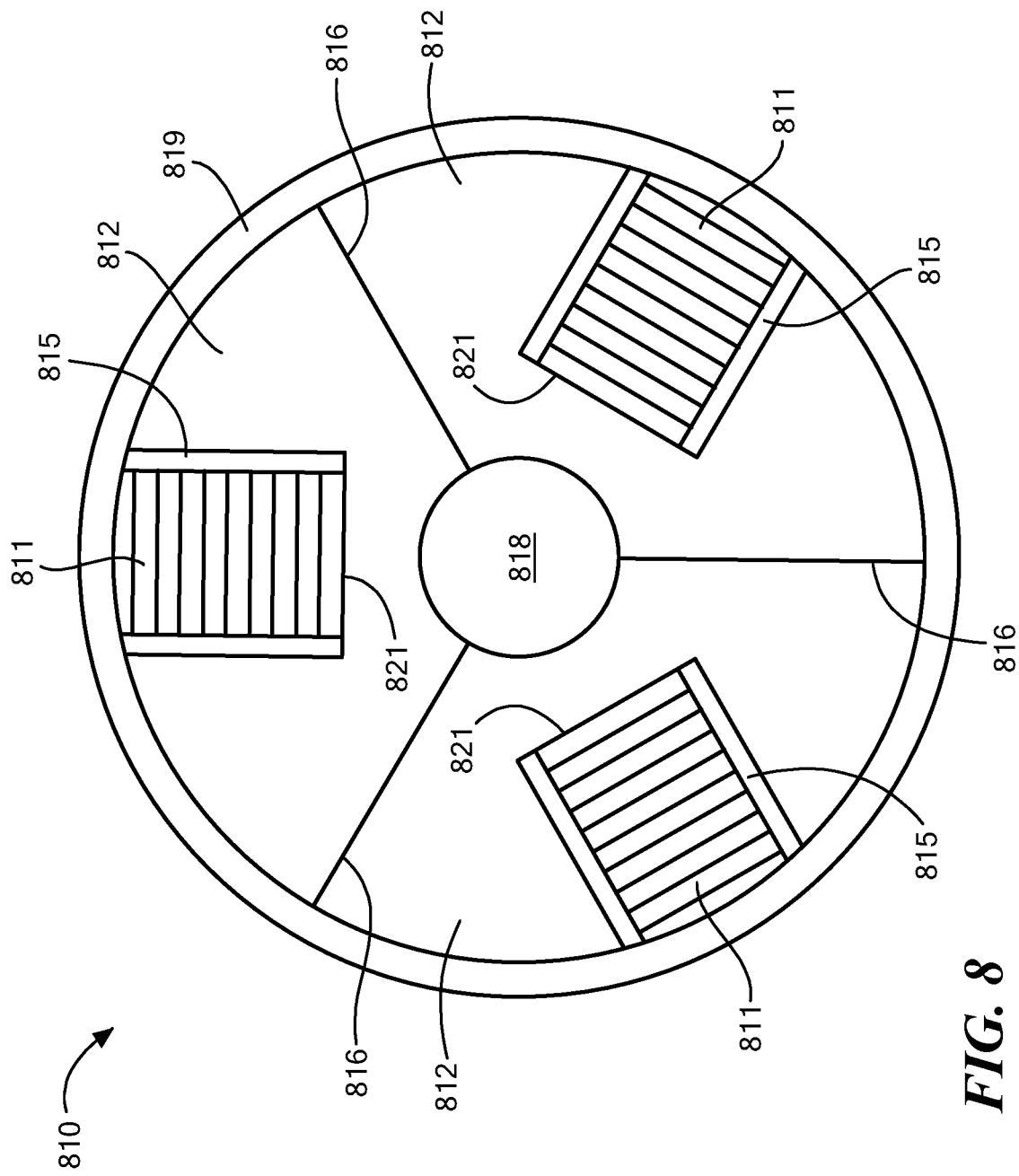
FIG. 8 is a cross sectional view of another embodiment of a cable that may be used as part of a rotor or stator of a wind turbine generator.

Referring to FIG. 8, cable 810 is an example of cable 100 shown in FIG. 1 that includes electrically conductive segments 812 arranged in a radially symmetric manner around a central cooling channel 818. The electrically conductive segments 812 are configured to hold respective HTS tape stacks 811 within respective channels 821 within each segment. The channels 821 are arranged at a perimeter of each segment.

In embodiments, cable 810 comprises a jacket 819 arranged exterior to the electrically conductive segments. Jacket 819 may comprise, or may consist of, steel, Inconel®, Nitronic® 40, Nitronic® 50, Incoloy®, or combinations thereof.

In the example of FIG. 8, the HTS tape stacks 811 are arranged in contact with an alloy 815, which provides at least part of the electrical contact between the HTS tape stacks and each respective electrically conductive segment 812. One technique to produce electrical contact between the HTS tape and the electrically conductive segment is to fill space between the tape and the segment with a liquid alloy such as solder. As such, the alloy 815 may comprise, or may consist of, a Pb and/or Sn solder. In some embodiments, the alloy 815 may comprise a metal having a melting point of less than 200° C., wherein at least 50 wt % of the metal is Pb and/or Sn, and at least 0.1 wt % of the metal is Cu.

Further examples of, and information about, the cables shown in FIG. 7 and FIG. 8 can be found in PCT Application No. PCT/US21/20916 (filed Mar. 18, 2021) and U.S. Provisional Patent Application No. 62/985,546 (filed Mar. 7, 2021), which are incorporated herein by reference in their entirety.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "X" over element "Y" can include situations in which one or more intermediate elements (e.g., element "Z") is between elements "X" and elements "Y" as long as the relevant characteristics and functionalities of elements "X" and "Y" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e. one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether or not explicitly described.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

The invention claimed is:

1. An electrical generator comprising:
   a stator, the stator comprising:
      a plurality of high-temperature superconducting (HTS) magnets configured to generate a first magnetic field;
      a stator coil having a first plurality of coils configured to generate a second magnetic field;
   a rotor comprising:
      a second plurality of conductive coils, the rotor configured to rotate so that the conductive coils move through the first magnetic field generated by the plurality of HTS magnets to produce electrical power; and
      a third plurality of conductive coils coupled in series with the second plurality of conductive coils and positioned to rotate through the second magnetic field; and
   wherein the first plurality of coils of the stator coil and the third plurality of conductive coils are positioned closer to a centerline of the electrical generator than the plurality of HTS magnets and the second plurality of conductive coils.

2. The electrical generator of claim 1 wherein the rotor is coupled to a wind turbine that rotates the rotor.

3. The electrical generator of claim 1 wherein the plurality of HTS magnets are arranged to form a ring around the rotor.

4. The electrical generator of claim 1 wherein at least one HTS magnet of the plurality of HTS magnets comprises:
a coil comprising an HTS tape;
a housing comprising at least a first partition, wherein:
the coil is arranged within the housing;
the first partition of the housing is arranged to separate a first portion of the coil from a second portion of the coil such that turns of the first portion of the coil are entirely arranged within the first partition and turns of the second portion of the coil are entirely arranged outside of the first partition; and
the first partition comprises a slit through which current leads of the coil pass.

5. The electrical generator of claim 4 wherein the first partition is configured to distribute mechanical forces within the at least one HTS magnet.

6. The electrical generator of claim 4 wherein the at least one HTS magnet of the plurality of HTS magnets comprises an electrically conducting material arranged between at least some electrically insulated turns of the coil.

7. The electrical generator of claim 1 wherein at least one HTS magnet of the plurality of HTS magnets comprises:
a plurality of pancakes, each of the pancakes having one or more turns of high temperature superconductor (HTS) tape and one or more joints for electrically coupling the one or more turns of HTS tape as part of an electrical circuit; and
a plurality of cooling plates, each of the cooling plates having a terminal for thermally coupling the cooling plate to a cooling apparatus;
wherein the plurality of pancakes and the plurality of cooling plates are stacked in an alternating fashion, each of the pancakes being electrically coupled by its one or more joints to the joints of either one or two neighboring pancakes, thereby forming an operating current path that includes the HTS tape in each of the pancakes, and each of the pancakes being adjacent to either one or two of the cooling plates for removing heat from the pancake via thermal conduction to the cooling apparatus.

8. The electrical generator of claim 1 wherein at least one HTS magnet of the plurality of HTS magnets has an oblong shape.

9. The electrical generator of claim 1 wherein at least one coil of the second plurality of conductive coils comprises at least one cable having a plurality of HTS components.

10. The electrical generator of claim 9 wherein the at least one coil of the second plurality of conductive coils further comprises:
a plurality of electrically conductive segments extending along the cable, each of the plurality of electrically conductive segments comprising one of the plurality of HTS components; and
an electrically insulating material arranged between adjacent electrically conductive segments of the plurality of electrically conductive segments that electrically insulates the plurality of electrically conductive segments from one another.

11. The electrical generator of claim 9 wherein the plurality of HTS components comprises HTS tape.

12. The electrical generator of claim 11 wherein the plurality of HTS components comprises a stack of HTS tape.

13. The electrical generator of claim 1 wherein at least one coil of the first plurality of conductive coils and/or at least one coil of the third plurality of conductive coils comprises a cable having a plurality of HTS components.

14. The electrical generator of claim 13 wherein the cable comprises:
a plurality of electrically conductive segments extending along the cable, each of the plurality of electrically conductive segments comprising at least one of the plurality of HTS components; and
an electrically insulating material arranged between adjacent electrically conductive segments of the plurality of electrically conductive segments that electrically insulates the plurality of electrically conductive segments from one another.

15. A turbine generator comprising:
a stator, the stator comprising first and second stator coils, each of first and second stator coils comprising a plurality of high-temperature superconducting (HTS) magnets;
a rotor comprising first and second rotor coils with phases of the first rotor coil coupled in series with like phases of the second rotor coil and with the first rotor coil positioned closer to a centerline of the turbine generator than the first stator coil, the second rotor coil positioned closer to a centerline of the turbine generator than the first rotor coil and the second stator coil positioned closer to a centerline of the turbine generator than the second rotor coil; and
a plurality of wind turbine blades coupled to the rotor.

16. The turbine generator of claim 15 wherein the first and second rotor coils comprises at least one cable, the at least one cable comprising:
a plurality of HTS components;
a plurality of electrically conductive segments extending along the cable, each of the plurality of electrically conductive segments comprising at least one of the plurality of HTS components; and
an electrically insulating material arranged between adjacent electrically conductive segments of the plurality of electrically conductive segments that electrically insulates the plurality of electrically conductive segments from one another.

17. The turbine generator of claim 15 wherein at least one HTS magnet of the plurality of HTS magnets comprises:
an HTS tape in at least one of the first and second stator coils;
a housing comprising at least a first partition; wherein:
the at least one of the first and second stator coils is arranged within the housing;
the first partition of the housing is arranged to separate a first portion of the at least one of the first and second stator coils from a second portion of the at least one of the first and second stator coils such that turns of the first portion of the at least one of the first and second stator coils are entirely arranged within the first partition and turns of the second portion of the at least one of the first and second stator coils are entirely arranged outside of the first partition; and
the first partition comprises a slit through which pass current leads of the at least one of the first and second stator coils.

18. A turbine generator comprising:
a stator comprising first A and second D stator coils for generating respective ones of first and second magnetic fields; and
a rotor comprising first B and second C rotor coils with phases of the first rotor coil coupled in series with like phases of the second rotor coil C and with the first rotor coil B positioned closer to a centerline of the turbine generator than the first stator coil A; the second rotor coil C positioned closer to a centerline of the turbine generator than the first rotor coil B; and the second stator coil D positioned closer to a centerline of the turbine generator than the second rotor coil C wherein the first rotor coil B is configured to move through the first magnetic field and the second rotor coil C is configured to move through the second magnetic field.

19. An electric machine, comprising:
a stator, the stator comprising at least first and second stator coils with at least one of the at least one first and second stator coils including high-temperature superconducting (HTS) material; and
a rotor comprising at least first and second rotor coils with phases of the first rotor coil coupled in series with like phases of the second rotor coil and with the first rotor coil positioned closer to a centerline of the electric machine than the first stator coil, the second rotor coil positioned closer to a centerline of the electric machine than the first rotor coil and the second stator coil positioned closer to a centerline of the electric machine than the second rotor coil wherein at least one of the first and second rotor coils includes HTS material, the rotor configured to rotate relative to the stator.

20. The electric machine of claim 19, wherein the electric machine is a generator.

21. The electric machine of claim 20, wherein the generator is a wind turbine generator.

* * * * *